May 3, 1949.  J. C. SHAW  2,469,316
HEAT-EXCHANGE UNIT
Filed June 8, 1946  2 Sheets-Sheet 1
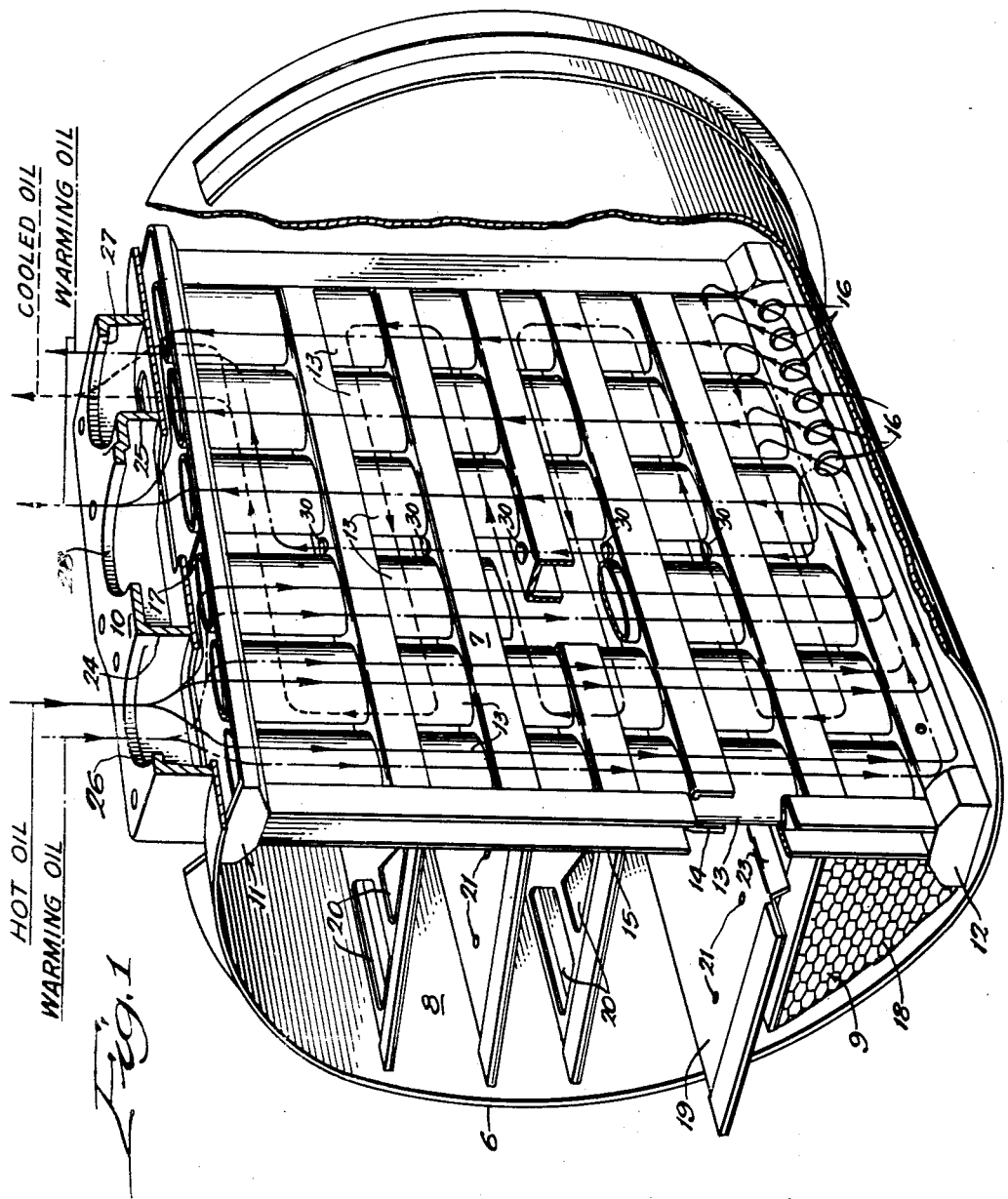
Inventor:
Joe C. Shaw,
By Soans, Pond & Anderson
Attorneys.

May 3, 1949. J. C. SHAW 2,469,316
HEAT-EXCHANGE UNIT
Filed June 8, 1946 2 Sheets-Sheet 2
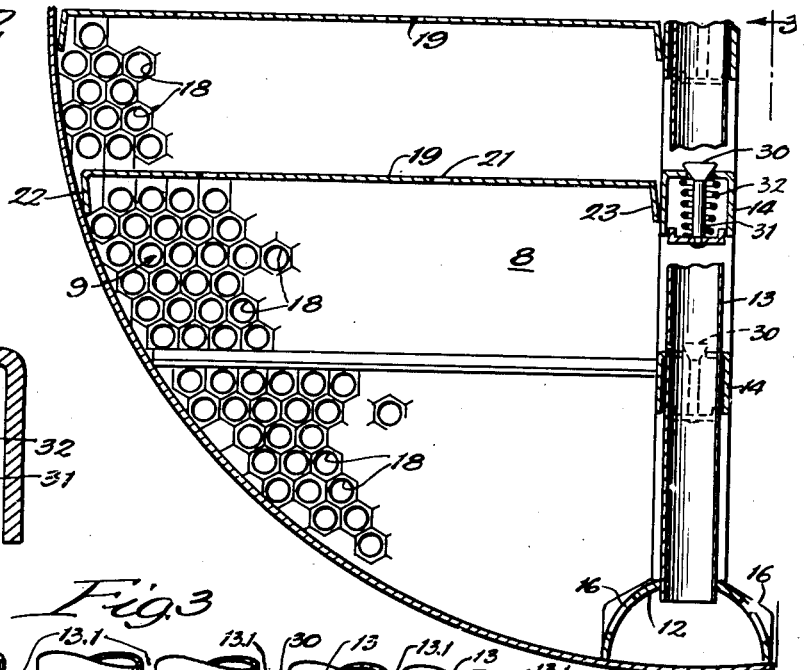
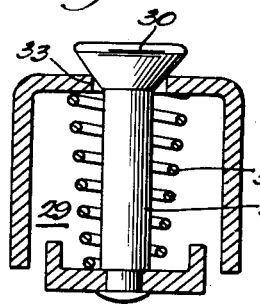
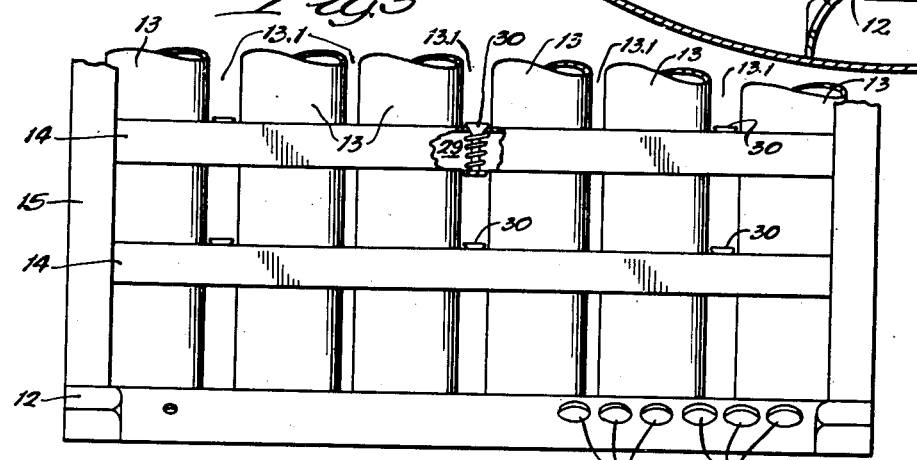
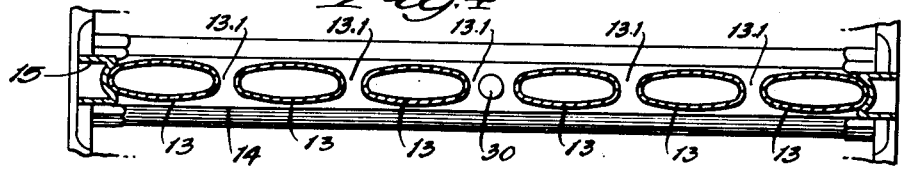
Inventor:
Joe C. Shaw,
Attorneys.

Patented May 3, 1949

2,469,316

UNITED STATES PATENT OFFICE 2,469,316

HEAT-EXCHANGE UNIT

Joe C. Shaw, Racine, Wis., assignor to Young Radiator Company, Racine, Wis., a corporation of Wisconsin Application June 8, 1946, Serial No. 675,471

2 Claims. (Cl. 257—2)

This invention relates to improvements in a heat-exchange unit of the type wherein the transfer of heat between a cooling medium and a coolant is effected by passing the cooling medium through a bundle of tubes around and between which is formed a core for the circulation of the coolant. With heat-exchange units of this type, developed for use with aircraft engines, the cooling medium is air forced through the bundle of tubes and the coolant is lubricating oil circulated through the engine. Such a heat-exchange unit generally comprises a cylindrical housing wherein is arranged a bundle of cylindrical tubes whose ends are so bonded together as to space the tubes apart throughout almost their entire length and constitute the space surrounding the tubes into a sealed core through which the oil circulates. In most of these structures partitions or baffle plates are arranged between the tubes and are provided with openings so as to cause a back and forth flow of the oil through the core axially of the tubes between the inlet and outlet ports of the housing.

In modern aircraft it is essential to superior operation of the engine to keep the lubricating oil as nearly as possible at a uniform temperature. Such uniform temperature must be maintained regardless of the extremely varying temperatures around and above the earth's surface where aircraft are used and regardless of the extreme conditions created by the operations of the aircraft. The attainment of such ends is measurably dependent upon the possibilities of retarding as much as possible the congealing of the oil in the heat-exchange cores and, when congealed, of accomplishing its decongealing as quickly as possible.

The main objects of this invention, therefore, are to provide improved arrangement of means in a heat-exchange unit of the type above designated which will effectively accomplish the aforesaid purpose of retarding the congealing of the oil in the core and facilitating its decongealing and flushing following its congealment; to provide an improved valve mechanism for accomplishing this purpose the operation of which is automatically regulated by the conditions of the oil within the core; and to provide a valve mechanism of this kind which is simple in construction, easily assembled in the structure, and positive in operation.

A preferred embodiment of this invention, incorporated in a heat-exchange unit of the construction disclosed in co-pending application Serial No. 508,104, filed October 29, 1943, is shown in the accompanying drawings, wherein:

Fig. 1 is a partially sectional, isometric perspective of an incompletely assembled heat-exchange device such as disclosed in the aforesaid co-pending application, a valve mechanism, embodying this invention, being arranged therein;

Fig. 2 is an enlarged quarter-sectional elevation of the same;

Fig. 3 is a side elevation of the lower part of the warm-up chamber construction for a heat-exchange unit of the aforesaid type as viewed from the plane of the line 3—3 of Fig. 2, but showing a spacing of the warm-up chamber tubes so as to permit the use of three tiers of valve mechanisms, rather than one tier as shown in Fig. 1;

Fig. 4 is a horizontal sectional detail of the warm-up chamber with the valve arrangement as shown in Fig. 1; and Fig. 5 is an enlarged cross-sectional elevation of the valve means.

A heat-exchange device constructed in accordance with the disclosure made in the aforesaid co-pending application, and wherewith this improved form of valve mechanism has been associated, comprises a supporting shell or housing 6 wherein is arranged a transverse, axially-disposed warm-up chamber 7 which divides or partitions the shell 6 into two compartments 8, in each of which is arranged a symmetrically-formed complementary heat-exchange core 9. These several parts are so arranged that there is intercommunication between the warm-up chamber 7 and the heat-exchange cores 9 and with chambers and ports formed in a valve base 10, whereon is mounted a valve mechanism (not shown) adapted to regulate the flow of oil, through the warm-up chamber and the several sections of the heat-exchange cores 9, in its passage from the engine to the oil supply tank (neither of which is shown). Special valve mechanism 29, to be described in detail hereinafter, is arranged to permit communication between adjacent sections of the heat-exchange cores 9, depending upon the predetermined differential in the condition of the oil in said adjacent core sections.

The shell 6 is a single piece of sheet metal with its lateral edges welded together to form a cylindrical housing. As most clearly shown in the aforesaid co-pending application, suitable means are secured on the exterior of the housing to permit the mounting of the unit in its proper position on an aircraft or other device, with which it is intended to be used.

The location and the structural form of the warm-up chamber 7, axially across the middle portion of the shell 6, is one of the principal features of the disclosure of the aforesaid application. Such a warm-up chamber comprises a pair of headers 11 and 12 and a series of tubes 13, with which are associated baffle-plate supporting bars 14 and end plates or closures 15.

The headers 11 and 12 are secured to the inner surface of the shell 6 at diametrically-opposed points. Between the headers are arranged the tubes 13 and the end plates or closures 15. The baffle-plate supporting bars 14 extend between and are secured at their ends to the end plates or closures 15. These headers, as shown most clearly in Figs. 1 and 3, are of arcuate cross-section but have their ends expanded to a polygonal form so as to better fit with the hexagonal ends of the tubes of the heat-exchange cores 9, as will be indicated more clearly hereinafter. A number of openings 16 are formed in the sides of the lower header 12 at one end to provide communication between the warm-up chamber 7 and the adjacent portions of the cores 9, as will be pointed out more clearly hereinafter. The combined area of the openings 16, on both sides of the header 12, is substantially equal to the area of the inlet and outlet openings in the valve base 10.

The upper header 11 may or may not have a partition 17 located therein, intermediate the ends thereof, depending upon the path it is desired to have the oil take through the tubes 13. When a partition 17 is employed, as shown in Fig. 1, the tubes 13 are divided into two groups, one group of which communicates with the inlet port in the valve base 10, and the other group of which communicates with the valve-base outlet port. When the partition 17 is omitted all the tubes 13 are in communication with said inlet port.

The tubes 13, whether elliptical or circular, have their ends inserted through suitable openings in the headers 11 and 12, and are preferably silver soldered thereto. The tubes are also inserted through suitable openings in the baffle-plate supporting bars 14 and may or may not be silver soldered thereto. The tubes 13 are spaced apart axially of the shell 6 and thus provide areas 13.1 longitudinally of the tubes which afford communication radially of the shell between the heat-exchange cores 9 on opposite sides of the warm-up chamber 7. These tubes 13, as will be seen from Fig. 4, are spaced slightly away from the contiguous tubes of the cores 9. Thus the areas 13.1 between the tubes 13 have intercommunication around the tubes 13. Moreover, these areas 13.1 being larger in extent than the areas in the cores, and the oil therein being exposed to the oil flowing through the warm-up chamber tubes 13, the oil in these areas congeals less slowly than does the oil in the more remote parts of the cores 9, and when it does congeal thaws much more rapidly than does the oil in any other part of either of the cores 9.

The baffle-plate supporting bars 14 are of U-shaped cross section. At their ends they are soldered or otherwise secured to the end plates or closures 15.

Each of the heat-exchange cores 9 comprises an arrangement of cylindrical tubes 18 conventional for this type of heat-exchange unit. The tubes have their ends expanded and hexagonally formed so that the tubes are supported in spaced relationship throughout almost their entire lengths, thus forming a cavity around and between the tubes. These hexagonal enlargements are bonded together so as to seal the cavity around the tubes 18, within which oil may be circulated for heat-exchange exposure to the air flowing through the tubes 18.

The usual series of baffle plates 19 are interposed at intervals between the tubes 18, thereby dividing each of the heat-exchange cores 9 into a plurality of sections. Adjacent plates are provided with suitable openings 20 (see Fig. 1), at opposite ends axially of the shell, so as to cause the oil to follow a circuitous back and forth path in its passage through the cores as indicated by the arrow-headed dotted lines in Fig. 1. In the disclosure in the aforesaid co-pending application, each of these baffle plates also has special orifices 21 (see Fig. 1) formed in the middle area thereof and at the end opposite to the main openings 20. These orifices permit a trickling through of the inflowing warmer oil from the underside of the baffle plate to the space directly above the baffle plate. As shown in Figs. 1 and 2, the baffle plates have flanges 22 and 23 formed along the lateral edges thereof which rest against and form comparatively oil-tight contact with the inner face of the shell 6 and the sides of the U-shaped baffle-plate supporting bars 14 respectively. These baffle plates may be either plane or corrugated in form.

The valve base 10 is secured, preferably by silver soldering, to the shell 6 in alinement with the warm-up chamber 7. Partitions 24 and 25 (see Fig. 1) divide the base into three chambers communicating with an inlet port 26 and outlet ports 27 and 28. A valve mechanism of a suitable construction is secured to the base 10 and interposed in the oil line leading from the engine to the oil supply tank and, depending upon the condition of the oil and the character of the valve mechanism, controls the path of the oil from its entrance through the inlet port 26 to its discharge through the outlet ports 27 and 28.

A heat-exchange unit of this general type, embodying the improved special valve means about to be described, may or may not incorporate the special spacing of the tubes 18 along the baffle plates 19 and of rows of tubes intermediate the baffle plates, as more particularly set forth in the aforesaid co-pending application. Whether or not the unit embodies these features will in no way affect the functioning of the special valve means now to be set forth.

The special valve means 29, embodying this invention, is arranged to provide a small flow of oil between adjacent core sections in advance of the oil flow through the baffle plate openings 20, depending upon a difference in the condition of the oil on the opposite sides of a baffle plate.

As herein shown the valve means 29 comprises a conical valve member 30 mounted on a stem 31 and which is urged by a spring 32 to be seated in an aperture 33 formed in the baffle-plate supporting bar 14. One or more of these valve means 29 are herein shown located in each of the baffle-plate supporting bars 14 between certain of the tubes 13. They might be placed at other points, however. In the construction shown in Fig. 1, a series of these valve means 29 are arranged midway between the ends of the shell 6 in each of the baffle-plate supporting bars 14. In the modification shown in Fig. 3 three sets of these valve means 29 are arranged in each of the baffle-plate supporting bars 14. It will be noted that where these valve means 29 are set into the baffle-plate supporting bars 14 the adjacent tubes are spaced apart a little greater distance than with the remainder of the tubes.

The spring 32 for each valve means 29 is so tensioned that the respective aperture 33 remains closed unless and until the condition of the oil in a core section on the valve-member side is such that the resistance to oil passage therethrough is so great that a pressure is built up in the core section on the spring-side of the valve means 29 greater than and counter to the pressure exerted by the spring 30. The tension on each spring would be approximately the same and comparatively low p. s. i. Because the effect of a series of these valves is cumulative and the total pressure drop through the series would be less than the pressure component of the relief valve in the valve control mechanism which would be mounted on the valve base 10.

The operation of a heat-exchange unit, equipped with this special valve mechanism, it will be understood, will be under the control of a suitable valve mechanism admitting oil through the inlet port 26 and directing its flow out of one or the other of the outlet ports 27 or 28 depending upon the viscous condition of the oil in the unit.

When the temperature of the oil entering such valve control mechanism is sufficient to permit the oil to enter the warm-up chamber 7, the oil will flow down through the tubes 13 as indicated by the arrow-headed dot-and-dash lines to the header 12. If the viscous condition of the oil in the cores 9 creates too great a pressure, the oil will flow out through the remaining tubes 13 to the outlet port 27 (as indicated by said arrow-headed dot-and-dash lines) until such time as flow can be established in the sections of the core 9 (as indicated by the arrow-headed dotted lines).

When the passage of the warming oil, coming directly from the engine, is permitted through the tubes 13, it tends to raise most quickly the temperature of the oil in the areas 13.1 surrounding the tubes 13. Meanwhile some of the warm oil coming in through the warm-up chamber 7 will be discharged through the openings 16 in the header 12 into the immediately contiguous sections of the cores 9. This will tend to facilitate the decongealing and warming up of the oil in the adjacent parts of the lowermost sections of the cores 9, below the first baffle 19.

On certain occasions an aircraft, equipped with heat-exchange units embodying this invention, operating in cold climates may be allowed to stand idle for a period of time. As a consequence the oil in the heat-exchange cores 9 is likely to congeal, sometimes very solidly. On other occasions the aircraft, so equipped, may be used at a considerable distance from the earth's surface where the temperature may be much below freezing, or the aircraft may be employed in a sudden dive so that the increased rush of air through the tubes 18 might tend to congeal the oil in at least parts of the heat-exchange cores 9.

Any attempt to resume or continue the use of the aircraft under any such circumstances often requires that a normal oil flow through the cores 9 be established very quickly. It is under such circumstances that the special valve mechanism 29 embodying this invention is of particular advantage.

If in any one of the sections of either of the cores 9 the oil becomes so viscous, because of its congealment, that oil flow cannot be established from the core section on the under-side of a baffle plate 19 through the opening 20 to the core section above such baffle plate, a pressure will be built up in the core section on the under- or spring-side of the baffle plate. As soon as such pressure exceeds the pressure of the spring 32 for a valve means 29, the valve member 30 will be retracted from the aperture 33. This will allow a small jet of the warmer or viscous oil to flow from the under to the upper core section. Such oil will tend to reduce the viscosity of the oil adjacent to the aperture 33 and subsequently to the oil more remote from the aperture. Therefore, when oil flow can be initiated through the baffle plate opening 20, to the core section above the baffle plate, there will be an accelerated flushing of the more viscous and not-yet-decongealed oil in the latter core section and an earlier complete flow of oil will result than would be the case with a heat-exchange unit of this kind not equipped with this special valve mechanism.

Variations and modifications in the details of structure and arrangement of the parts may be resorted to within the spirit and coverage of the appended claims.

I claim:

1. In a heat-exchange unit of the class described, the combination of a supporting shell, a plurality of tubes extending transversely across said shell in an axial plane and dividing said shell into two compartments, headers providing communication between the adjacent ends of said tubes, other axially-disposed tubes filling the space in each of said compartments and having their ends supported in bonded relationship so as to form a sealed fluid core surrounding said other tubes in each of said compartments, said transversely-disposed tubes being spaced apart from each other axially of said shell so as to form areas between said transversely-disposed tubes through which communication is afforded between the fluid cores of said compartments, one of said headers having openings formed therein to provide communication between said transversely-disposed tubes and said fluid cores, means providing a shell inlet port and a shell outlet port, said inlet port communicating through the other said header with said transversely-disposed tubes, said outlet port communicating with said fluid cores, baffle means interposed between certain of said axially-disposed tubes and extending transversely across said shell and dividing each of said compartments into two or more parallel sections, said baffle means having openings formed therein so as to effect a back-and-forth fluid flow through said core sections axially of said shell between the header openings and said fluid-core outlet port, one or more of said baffle means also having an aperture formed therein juxtaposed with a space between said first mentioned tubes affording communication between core sections on opposite sides of said baffle means in advance of the fluid flow through said baffle-means openings, and valve means actuated by a predetermined differential in the pressure of the fluid in the core sections on opposite sides of said baffle means for controlling communication through said apertures.

2. In a device of the class described, the combination of a supporting shell having inlet and outlet ports, a plurality of axial tubes filling the space within said shell and having their ends supported in bonded relationship so as to form a sealed fluid core within said shell surrounding said tubes and providing a fluid flow path between said ports, means having transversely-disposed portions arranged axially of said core and dividing said core into two tiers of superimposed core sections located side-by-side, said means having openings through which fluid flows successively from one of said superimposed core sections to another and having other openings formed in the portions thereof which divide the two tiers of said superimposed core sections and which latter openings provide communication between adjacent core sections in the plane of the portion of said means which divides the two tiers of superimposed core sections and in advance of the communication afforded by said first-mentioned openings, and valve means controlling said latter openings and adapted to be actuated by a predetermined pressure differential of the fluid in the respective core sections.

JOE C. SHAW.

REFERENCES CITED

The following references are of record in the file of this patent:

UNITED STATES PATENTS

| Number | Name | Date |
| --- | --- | --- |
| 2,293,960 | Young | Aug. 25, 1942 |
| 2,352,704 | Garner | July 4, 1944 |
| 2,376,198 | Shaw | May 15, 1945 |
| 2,395,943 | Skelly | Mar. 5, 1946 |
| 2,406,203 | Cruzan | Aug. 20, 1946 |

FOREIGN PATENTS

| Number | Country | Date |
| --- | --- | --- |
| 460,047 | Great Britain | Jan. 20, 1937 |